United States Patent [19]

Deal

[11] Patent Number: 4,521,305
[45] Date of Patent: Jun. 4, 1985

[54] ROTATING SELF-CLEANING SCREEN
[76] Inventor: Troy M. Deal, 277 Trismen Ter., Winter Park, Fla. 32789
[21] Appl. No.: 594,199
[22] Filed: Mar. 28, 1984
[51] Int. Cl.³ .................. B01D 33/06; B01D 35/16
[52] U.S. Cl. .................................. 210/158; 37/57; 37/66; 210/161; 210/357
[58] Field of Search ............... 37/57, 66; 209/381, 209/296, 297; 210/396, 158, 161, 357

[56] References Cited
U.S. PATENT DOCUMENTS

| 257,633 | 5/1882 | Adam | 37/57 X |
|---|---|---|---|
| 558,572 | 4/1896 | Schacke | 210/396 X |
| 1,155,370 | 10/1915 | Randles . | |
| 1,169,745 | 1/1916 | Haddon | 37/57 X |
| 1,701,430 | 2/1929 | Thurston | 37/66 |
| 2,250,693 | 7/1941 | York et al. | 37/57 X |
| 2,260,293 | 10/1941 | Brown | 37/57 |
| 2,819,542 | 1/1958 | Stewart et al. | 37/67 |
| 3,521,387 | 7/1970 | Degelman | 37/66 |
| 3,556,598 | 1/1971 | Smith | 37/57 X |
| 3,971,148 | 7/1976 | Deal | 37/66 |
| 4,004,359 | 1/1977 | Klip | 37/66 |
| 4,083,134 | 4/1978 | Oterdoom | 37/58 |
| 4,255,882 | 3/1981 | Verboom | 37/66 |
| 4,365,427 | 12/1982 | Chapman, Jr. | 37/57 |
| 4,399,622 | 8/1983 | Howard | 37/57 |

FOREIGN PATENT DOCUMENTS

| 79430 | 7/1932 | Sweden | 210/396 |
|---|---|---|---|
| 601419 | 4/1978 | U.S.S.R. | 37/66 |

Primary Examiner—Clifford D. Crowder
Attorney, Agent, or Firm—Beaman & Beaman

[57] ABSTRACT

A rotating self-cleaning screen capable of functioning as a dredge cutterhead, and also usable to screen debris from a conduit. A motor-driven rotating drum screen having openings defined in the periphery thereof includes a debris ejector rotating about an axis parallel to the drum screen axis utilizing a plurality of teeth which synchronously extend through the screen openings at a predetermined peripheral location ejecting debris from the screen openings. Apparatus is provided for stripping the debris from the teeth, and receiving debris removed from the screen.

4 Claims, 9 Drawing Figures

ROTATING SELF-CLEANING SCREEN

BACKGROUND OF THE INVENTION

Fluid-handling apparatus such as dredge suction heads, and dredge conduits, require some type of screening to eliminate the entrance of large objects which will damage the pump impeller, or other components of the system. Usually, such screens consist of rectangular openings of a dimension which permits entrance of the size of a particle acceptable to the pump and conduit system and excludes others.

Debris which cannot pass through the screen will collect on the screen and be held thereagainst by the fluid flow. The screen will quickly collect such debris and become clogged if means for cleaning the screen are not available. Manual screen cleaning is time consuming and troublesome and with underwater dredging systems screen cleaning requires extensive time and expense.

A variety of devices have been utilized with dredging operations to control the size of particles entering the dredging system, and reference is made to U.S. Pat. Nos. 1,155,370; 2,260,293; 4,004,359 and 4,083,134. While the devices shown in the aforementioned patents will protect the fluid-handling system with which they are associated, screen clogging will still occur, and heretofore effective cleaning of high-capacity screens has been a serious problem.

It is an object of the invention to provide a screen for dredging systems and the like capable of handling high capacity flow, and yet effective continuous screen cleaning is provided.

A further object of the invention is to provide a rotary screen for a hydraulic system wherein ejectors sequentially clean debris from each screen opening, and the debris may be discarded or collected.

Another object of the invention is to provide a rotary screen for hydraulic systems wherein a power-driven debris ejector is used in conjunction with a rotary screen, and the ejector is rotated by the screen prime mover.

Yet another object of the invention is to provide a rotary screen which simultaneously functions as a cutterhead for underwater dredging.

A further object of the invention is to provide a rotating screen for hydraulic systems wherein the screen may be incorporated into a conduit system, and debris cleaned from the screen is collectable for removal from the hydraulic system.

In the practice of the invention a screen in the form of a drum is rotated by a hydraulic motor. The periphery of the screen is defined by a plurality of longitudinally extending slats or rails, and axially spaced rings adjacent the rails form rectangular openings at the screen periphery.

An ejector shaft is located within the screen drum parallel to the drum axis of rotation, and a plurality of ejector teeth or cones radially extend from the ejector shaft. The ejector shaft is located adjacent the screen periphery and rotates in synchronization with the screen drum whereby the teeth thereof sequentially extend through and beyond the screen periphery openings. In this manner the teeth eject debris from the openings and maintain the openings clear for fluid flow therethrough.

Preferably, a housing is located adjacent the ejector teeth having slots defined therein for receiving the teeth whereby movement of the teeth through the slots strips debris from the teeth. When the screen is used in a conduit system a debris receiving receptacle is preferably located adjacent the ejector for receiving the foreign matter removed from the screen.

Rotation of the ejector shaft is by means of a pinion gear engaging a ring gear concentrically attached to the screen drum. Thus, synchronization of rotation between the drum and ejector shaft is assured, and only the single motor rotating the screen drum is required to rotate both the screen and the ejector shaft.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
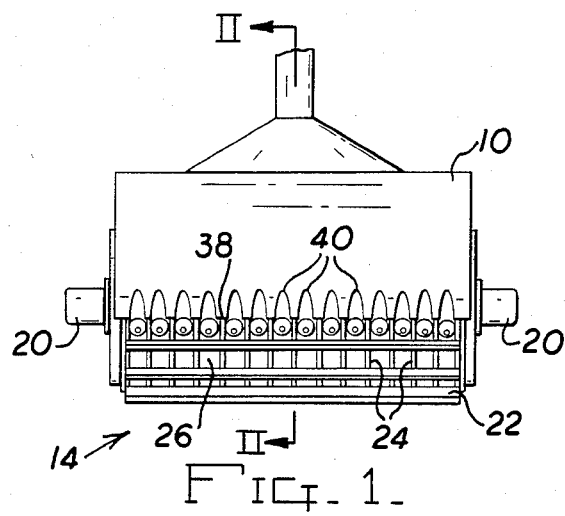
FIG. 1 is a top plan view of apparatus of the invention as used in a dredge cutterhead.
Figure 2:
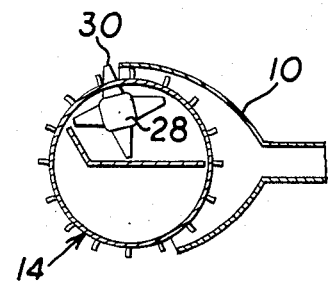
FIG. 2 is an elevational, sectional view as taken along Section II—II of FIG. 1.
Figure 3:
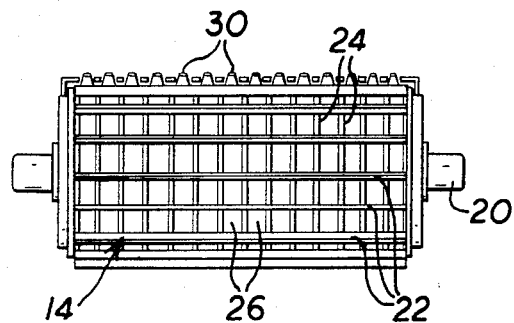
FIG. 3 is a front elevational view of the apparatus of FIG. 1.

In FIGS. 1-5 the rotating drum screen of the invention is shown in the environment of a dredge cutterhead as used to clear waterways, channels and the like. The cutterhead includes a housing 10 of sheet metal having a substantially rectangular front opening 12 in which the drum screen 14 is mounted. The housing 10 is supported from a dredge, not shown, by outriggers 16 and a suction outlet 18 communicates with a pump suction hose or conduit.

Figure 4:
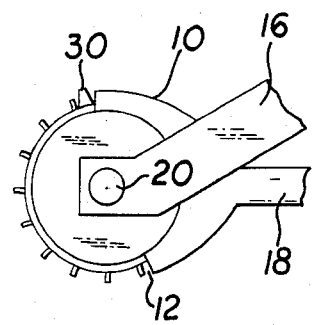
FIG. 4 is an end elevational view as taken from the right end of FIG. 3.
Figure 5:
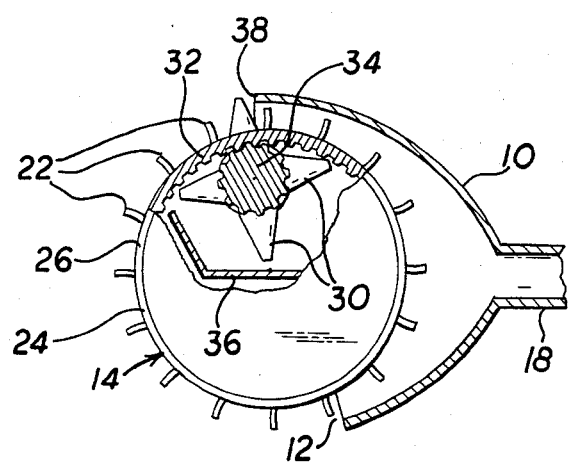
FIG. 5 is an end elevational view, partially sectioned, illustrating the ring and pinion gear apparatus.

The drum screen 14 is of a cylindrical form and is rotatably mounted upon the outriggers 16, FIG. 4, and is rotated by hydraulic motors 20 located at each end of the drum stub shafts, not shown.

The periphery of the drum includes a plurality of circumferentially spaced rails or slats 22 welded to a plurality of axially spaced rings 24. The rails and rings form a plurality of rectangular screen openings 26, best seen in FIG. 3. The dimension of the openings 26 will determine the size of particles capable of passing through the screen.

Clearing of the screen openings 26 is accomplished by ejector apparatus including an ejector shaft 28 rotatably supported within the drum screen 14 radially spaced and parallel to the drum screen axis. The shaft includes a plurality of radially extending teeth or cones 30, four teeth projecting at 90° intervals at each axial location. The dimension of the teeth 30 is such that the teeth may be received within and extend through the openings 26, and the location of the ejector shaft and the length and dimension of the teeth is such that synchronous rotation of the ejector shaft with the drum screen permits sequential teeth 30 to enter adjacent openings 26.

Rotation of the ejector shaft 28 is by means of a ring gear 32 affixed to the drum screen and concentric thereto. The teeth of the ring gear 32 mesh with the pinion gear 34 mounted upon the ejector shaft 28, and in this manner rotation of the drum screen 14 drives the ejector shaft at a higher rate of revolution, and in synchronization with the drum shaft.

The ejector apparatus is protected by an ejector guard and deflector pan 36 within the drum screen, and fluid flow through the drum screen is relatively unimpeded.

As will be appreciated from FIG. 1, the housing 10 includes an upper edge 38, and a plurality of slots 40 are defined in the upper edge in alignment with the teeth 30. The length of the teeth is such that they project through the slots 40, and in this manner the slots will strip debris from the teeth which may accumulate thereon.

In operation, the dredge head is lowered to the area to be dredged, and the hydraulic motors 20 are energized. The rotation of the drum screen 14 will cause the rails 22 to agitate the spoils, and the flow of water through the drum screen and into the housing and pump inlet will remove the spoils material dug by the screen due to the clockwise rotation, FIG. 2, of the screen.

Rocks and other foreign matter too large to pass through the openings 26 may remain in the openings until engaged by the teeth 30 as the debris approaches the housing edge 38. The teeth will eject the foreign particles from the screen openings 26 up over the housing 10, and the stripping action of the slots 40 will keep the teeth clean of mud, clay, and other particles tending to adhere to the teeth.

As the screen openings will be cleaned during each revolution of the drum screen, the openings 26 will be maintained open, and the screen will function in an efficient manner even when dredging spoils filled with particles incapable of passing through the screen openings.

Figure 6:
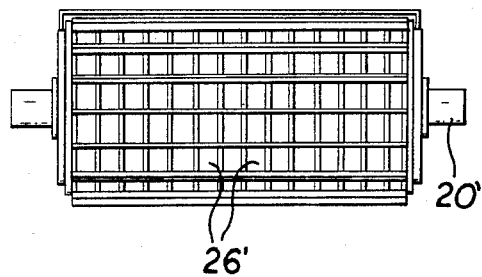
FIG. 6 is a front elevational view of a modification of dredge cutterhead apparatus in accord with the invention.
Figure 7:
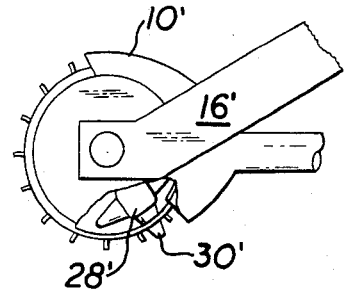
FIG. 7 is an end elevational view as taken from the right end of FIG. 6, partially sectioned.

In the embodiment of FIGS. 6 and 7 apparatus similar to that previously described is indicated by primed reference numerals. In this embodiment the ejector shaft 28' is located at the lower region of the housing 10' and the drum screen 14' will rotate in a counterclockwise direction, FIG. 7. The debris is ejected from the screen openings 26' at the lower region of the housing, rather than the upper region, and other than this difference, the operation of the dredge head will be as previously described.

Figure 8:
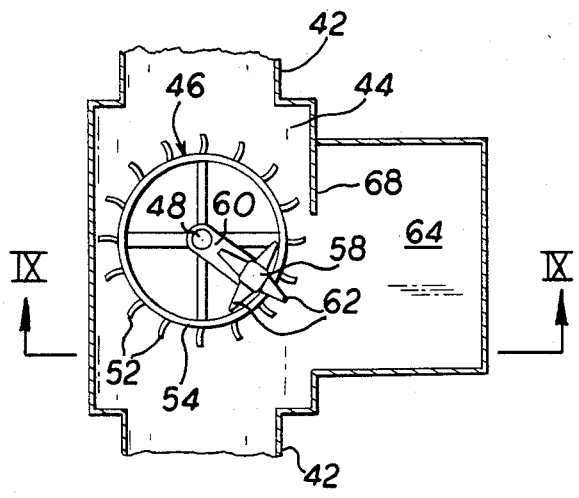
FIG. 8 is a top plan sectional view of the screen of the invention as incorporated in a conduit system, as taken along Section VIII—VIII of FIG. 9.
Figure 9:
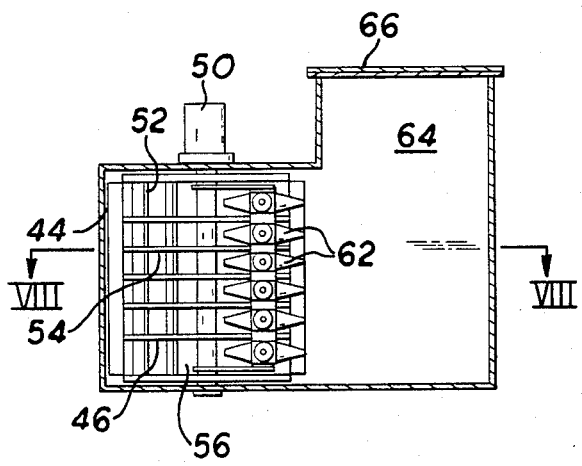
FIG. 9 is an elevational view of the apparatus of FIG. 8 as taken along Section IX—IX thereof.

FIGS. 8 and 9 illustrate the utilization of a drum screen in accord with the invention as incorporated into the suction line of a high capacity pump, such as a dredge pump.

The suction line 42 includes a chamber 44 in which the drum screen 46 is mounted for rotation about a vertical shaft 48. The shaft 48 is rotated counterclockwise by the motor 50, preferably of the hydraulic type. The drum screen includes the longitudinally extending rails 52 and a plurality of circumferentially extending rings 54 which define the screen openings 56, FIG. 9.

The ejector shaft 58 is mounted upon the shaft 48 by radial bracket 60, and teeth 62 radially extend from the ejector shaft. The ejector shaft is rotated by a pinion and ring gear structure, not shown, identical to that described above with respect to the embodiment of FIGS. 1-5.

A debris collection chamber 64 is defined adjacent the chamber 44 having a removable cover 66 for cleaning. A partition 68 extends adjacent the drum screen and slightly "behind" the ejector shaft whereby debris ejected from the drum screen by teeth 62 will enter the chamber 64 and be retained therein. Periodic cleaning of the chamber 64 will keep the apparatus functioning efficiently.

The screening apparatus of FIGS. 8 and 9 may be incorporated into a wide variety of conduit systems, either on the suction or pressure side of the pump, and as the screen openings are cleaned each rotation of the drum screen, the flow rated capacity of the system can be maintained regardless of the presence of foreign obstacles in the fluid which might otherwise tend to clog the screen.

While the preferred drive for the ejector shaft is the ring gear and pinion arrangement disclosed, it is also to be appreciated that the ejector shaft could be rotated merely by engagement of the projections with the screen openings. In such an arrangement the ejector projections function as pinion gear teeth, while the screen openings function as the teeth of a ring gear.

It is appreciated that various modifications to the inventive concepts may be apparent to those skilled in the art without departing from the spirit and scope of the invention.

I claim:

1. A self-cleaning screen for screening a flowing liquid comprising, in combination, a housing defining a flow path, a screen drum rotatably mounted within said housing about an axis transverse to said flow path and having a length and diameter substantially corresponding to the transverse cross-sectional height and width of the flow path, said screen drum having a circumference defined by a plurality of circumferentially spaced longitudinal elements substantially parallel to said axis and a plurality of circumferentially disposed axially spaced ring elements whereby said elements define a screen having adjacent openings, a motor mounted upon said housing continuously rotatably driving said drum during use, an ejector shaft within said drum rotatable about an axis substantially parallel to and offset from said drum axis, a plurality of radial fingers mounted upon said ejector shaft extendable through said screen openings, and ejector shaft drive means rotating said ejector shaft in synchronization with the rotation of said screen drum to sequentially extend said fingers through said screen openings to clean debris therefrom, said ejector shaft drive means comprising a ring gear concentrically mounted upon said screen drum, a pinion gear concentrically mounted upon said ejector shaft, said ring and pinion gears meshing whereby rotation of said screen drum rotates said ejector shaft.

2. In a self-cleaning screen as in claim 1, said motor driving said drum comprising a hydraulic motor.

3. In a self-cleaning screen as in claim 1, said housing including an edge adjacent said fingers, slots defined in said housing intersecting said edge closely receiving said fingers while extending through said openings whereby said slots will strip debris from said fingers.

4. In a self-cleaning screen as in claim 1, a conduit chamber having an inlet and an outlet, said screen drum being located within said chamber screening liquid flow therethrough, a debris receptacle communicating with said chamber receiving debris released from said drum by said fingers, and a removable access cover defined on said receptacle.

* * * * *